J. YOUNG.
Steam Plow.

No. 24,597. Patented June 28, 1859.

Witnesses:

Inventor:

UNITED STATES PATENT OFFICE.

JOHN YOUNG, OF JOLIET, ILLINOIS.

IMPROVEMENT IN ROTARY CULTIVATORS.

Specification forming part of Letters Patent No. 24,597, dated June 28, 1859.

*To all whom it may concern:*

Be it known that I, JOHN YOUNG, of Joliet, in the county of Will and State of Illinois, have invented a new and useful Improvement in Rotary Plows; and I do hereby declare that the following is a full, clear, and exact description of the same, reference being had to the accompanying drawings, forming a part of this specification, in which—

Figure 1:
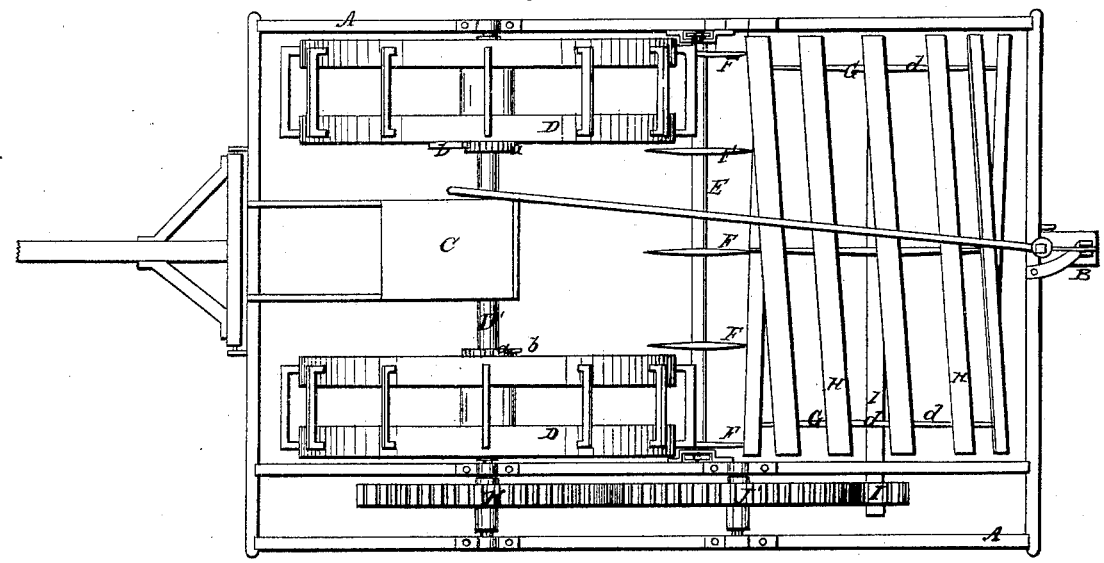
Figure 2:
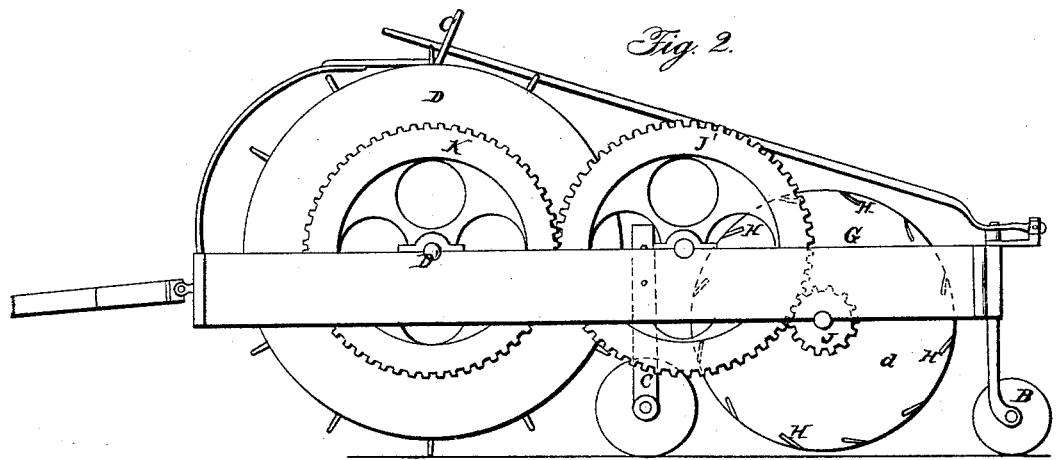

Figure 1 is a plan or top view of a rotary plow constructed after my invention. Fig. 2 is a side elevation of the same.

Similar letters of reference in each of the several figures indicate corresponding parts.

The nature of my invention consists in the arrangement and combination of a skeleton rotary cylinder of mold-boards set tangentially, and extending from end to end of the cylinder in a straight or oblique direction, in combination with a rotary shaft of circular-edged disks, substantially as hereinafter described, whereby, as the machine moves along, the sod is divided into strips, this being accomplished by the circular cutters, and then is raised in narrow slices and inverted, this being accomplished by the long tangential and straight or oblique set mold-boards.

My machine differs from all other rotary plows of this character in having its mold-boards form an open cylinder and extend from end to end of the cylinder, and set so as to lift and invert the soil. The centrifugal force, tangential set of the blade, and the forward motion of the machine insure the discharge of the soil in an inverted position behind the machine, and thus the carrying round of the soil in a circle is obviated. The oblique or spiral set of the mold-board also insures an easy cut, as the whole edge of the mold-boards does not come into contact with the soil at once, but gradually.

To enable others skilled in the art to make and use my invention, I will proceed to describe its construction and operation.

A represents a frame adapted for receiving the working parts of my rotary plow.

B is a caster-wheel for supporting the rear end of the frame and adjusting the plow so as to increase or lessen the depth of cut, and also for guiding its movements. This caster-wheel is arranged at the rear of the frame, and has a lever attached to it, which extends forward to the driver's seat, so as to be readily laid hold of.

C is the driver's seat.

D D are two large propelling or driving wheels for supporting the front part of the frame. These wheels are made rough on their circumference, so as to take hold of the soil, and thus act as a lever to set in motion certain gearing on their shaft or axle D', and thus transmit motion to other gearing which rotates the cylinder of mold-boards, presently described. The propelling-wheels are arranged loosely on the shaft, but combined with said shaft by ratchet-wheels and pawls *a a b b*, so as to revolve with it when the machine moves forward and to revolve independently of it when the machine moves backward.

E is a shaft of rotary colters or circular-edged disks F F F. This shaft is arranged transversely on the frame, so as to revolve by the resistance of the soil. They are placed in front of the cylinder of mold-boards low enough to cut into the sod the required depth, and thus prepare the same for being inverted. The standards *c c*, in which the shaft revolves, are made adjustable up and down, so as to vary the depth of cut of the circular disks or colters F F F.

G is the rotary skeleton-cylinder, which carries the long mold-boards H H. This cylinder consists of a series of circular-edged disks, *d d*, arranged fast in a vertical position on a transverse horizontal shaft, I, which has its bearing in the side pieces of the frame. The mold-boards are edged and set tangential, and also preferably oblique or spirally on the circumference of the disks *d d*. They, however, might be set straight and tangential upon the disks and still answer nearly as good purpose. The only difference is that they would not cut so easily, as the draw or gradual cut obtained by the spiral or oblique mold-boards would not be secured.

J' is a pinion on the end of the shaft I. This pinion gears into a large spur-wheel, J, which has its bearing on the frame A and gears with a similar-sized spur-wheel, K, on the axle D'.

From the above description of parts it will be evident that if the plow is drawn forward in the direction of the arrow 1 the gearing will set the cylinder of mold-boards revolving in the direction of the arrow 2. As the machine proceeds the circular colters or cutters cut the sod in strips longitudinally to the proper depth, and while this is occurring the long transverse mold-boards take hold of the sod with a nearly vertical cut and elevate narrow strips thereof successively, and when the strips arrive at the rear of the cylinder, and nearly as high or higher than its axis, they will stand inverted, and by centrifugal force, the forward motion of the machine, and the tangential set of the mold-boards they will escape at the rear of the machine in an inverted condition.

This machine, it is thought, will work admirably and leave no portion of the soil unplowed; and as it is simple, cheap, and strong, it will be an implement of great utility to the western or prairie farmer, who finds it a great saving to so invert the sod-land as to make the grass in its decay available as a manure.

What I claim as my invention, and desire to secure by Letters Patent, is—

The arrangement and combination of a skeleton or open rotary plowing cylinder when the mold-boards thereof are set tangential and extend from end to end of the cylinder in a straight or oblique direction, in combination with a rotary shaft of circular-edged disks, the whole being operated substantially as and for the purposes set forth.

JOHN YOUNG.

Witnesses:
   G. YORKE AT LEE,
   H. H. YOUNG.